United States Patent
Toda et al.

(10) Patent No.: US 9,493,665 B2
(45) Date of Patent: Nov. 15, 2016

(54) INK SET FOR INKJET AND INKJET RECORDING METHOD

(71) Applicants: Naohiro Toda, Kanagawa (JP); Juichi Furukawa, Kanagawa (JP); Hidefumi Nagashima, Kanagawa (KR); Tomohiro Nakagawa, Kanagawa (JP); Hikaru Kobayashi, Kanagawa (JP)

(72) Inventors: Naohiro Toda, Kanagawa (JP); Juichi Furukawa, Kanagawa (JP); Hidefumi Nagashima, Kanagawa (KR); Tomohiro Nakagawa, Kanagawa (JP); Hikaru Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/739,296

(22) Filed: Jun. 15, 2015

(65) Prior Publication Data

US 2016/0032122 A1 Feb. 4, 2016

(30) Foreign Application Priority Data

Jul. 29, 2014 (JP) .................................. 2014-153482

(51) Int. Cl.
*C09D 11/322* (2014.01)
*C09D 11/40* (2014.01)
*B41J 2/005* (2006.01)

(52) U.S. Cl.
CPC ............. *C09D 11/322* (2013.01); *C09D 11/40* (2013.01); *B41J 2/005* (2013.01)

(58) Field of Classification Search
None
See application file for complete search history.

(56) References Cited

U.S. PATENT DOCUMENTS

| | | | |
|---|---|---|---|
| 9,296,204 B2 * | 3/2016 | Gotou | ........................ B41J 2/01 |
| 2009/0085996 A1 * | 4/2009 | Kasai | ................... B41M 5/0011 |
| | | | 347/100 |
| 2009/0258196 A1 | 10/2009 | Nagashima et al. | |
| 2010/0196673 A1 | 8/2010 | Nagashima et al. | |
| 2011/0164086 A1 | 7/2011 | Goto et al. | |
| 2011/0205288 A1 | 8/2011 | Matsuyama et al. | |
| 2011/0318551 A1 | 12/2011 | Nakagawa | |
| 2012/0188312 A1 | 7/2012 | Nakagawa | |
| 2012/0308785 A1 | 12/2012 | Nakagawa | |
| 2013/0002776 A1 | 1/2013 | Nagashima et al. | |
| 2013/0063524 A1 | 3/2013 | Katoh et al. | |
| 2013/0197144 A1 | 8/2013 | Katoh et al. | |
| 2013/0271524 A1 | 10/2013 | Katoh et al. | |
| 2014/0192112 A1 | 7/2014 | Nagashima et al. | |
| 2014/0192121 A1 | 7/2014 | Bannai et al. | |
| 2014/0267520 A1 | 9/2014 | Toda et al. | |
| 2015/0017396 A1 | 1/2015 | Nakagawa et al. | |

FOREIGN PATENT DOCUMENTS

| | | |
|---|---|---|
| JP | 2005-220352 | 8/2005 |
| JP | 2011-094082 | 5/2011 |

(Continued)

*Primary Examiner* — An Do
*Assistant Examiner* — Renee I Wilson
(74) *Attorney, Agent, or Firm* — Oblon, McClelland, Maier & Neustadt, L.L.P.

(57) ABSTRACT

An ink set for inkjet contains a white ink and one or more color inks other than the white ink, wherein the ink set satisfies the following I to III:
  I. each ink comprises water, a pigment, resin particulates, a water soluble organic solvent, and a silicone-based surfactant accounting for 1% by weight to 3% by weight of the ink,
  II. the pigment contained in each of the one or more color inks is a reformed pigment reformed by at least one of a geminal bisphosphonic acid group or a geminal bisphosphonic acid salt group, and
  III. the water soluble organic solvent of the white ink comprises glycol ether having a boiling point of from 200 degrees C. to 250 degrees C.

6 Claims, 2 Drawing Sheets

(56) References Cited

FOREIGN PATENT DOCUMENTS

| | | |
|---|---|---|
| JP | 2011-201230 | 10/2011 |
| JP | 2011-202087 | 10/2011 |
| JP | 2013-189597 | 9/2013 |
| JP | 2013-189599 | 9/2013 |
| JP | 2013-216864 | 10/2013 |
| WO | WO 2012124790 A1 * 9/2012 ............ C09D 11/322 |

* cited by examiner

INK SET FOR INKJET AND INKJET RECORDING METHOD

CROSS-REFERENCE TO RELATED APPLICATIONS

This patent application is based on and claims priority pursuant to 35 U.S.C. §119(a) to Japanese Patent Application No. 2014-153482, filed on Jul. 29, 2014, in the Japan Patent Office, the entire disclosure of which is hereby incorporated by reference herein.

BACKGROUND

1. Technical Field

The present invention relates to an ink set for inkjet recording and an inkjet recording method.

2. Background Art

Since inkjet printers are relatively quiet, enjoy low running costs, and are capable of easily printing color images, they are now widely used at home as the output device of digital signals.

In recent years, inkjet technologies have been appealing in business field of, for example, display, posters, and signboards in addition to home use.

As the ink for inkjet recording for use in business fields, solvent-based inkjet ink containing a resin dissolved in an organic solvent as a vehicle or ultraviolet-curable inkjet ink using a polymerizable monomer as its main component have been widely used.

However, a large amount of the solvent of the solvent-based inkjet ink evaporates into air, which is not preferable in terms of burden on environment. Moreover, some ultraviolet curable inkjet ink have skin sensitization potential. In addition, since an ultraviolet ray irradiator built in a printer is expensive, the application field of the solvent-based inkjet is limited.

In this backdrop and considering it is less burden on the environment, inkjet technologies using an aqueous ink widely used at home have been developed for industrial use.

However, such aqueous inks have disadvantages with regard to image quality in comparison with a solvent-based inkjet ink.

One of these is that since water has a strong surface tension, ink droplets do not easily spread widely on non-permeating media made of non-porous materials such as vinyl chloride, acrylic, and polyethyleneterephthalate for use in business purpose, so that voids (gaps) appear in images and surface smoothness lowers. That is, it is difficult to form an even film. One way to solve this problem is a method using a surfactant to lower surface tension so as to make ink droplets easily spread on non-permeating media.

In addition, since water in aqueous inks has to be evaporated, the aqueous ink is inferior about quick dryness in comparison with solvent-based inks so that image blur tends to occur to formed images. In the case of high performance printing in particular, plenty of ink is discharged at once, which easily accelerates such image blur. To solve this problem, methods of heating images during printing are disclosed.

SUMMARY

According to the present invention, provided is an improved ink set for inkjet which contains a white ink and one or more color inks other than the white ink, wherein the ink set satisfies the following I to III:

I. each ink comprises water, a pigment, resin particulates, a water soluble organic solvent, and a silicone-based surfactant accounting for 1% by weight to 3% by weight of the ink, II. the pigment contained in each of the one or more color inks is a reformed pigment reformed by at least one of a geminal bisphosphonic acid group or a geminal bisphosphonic acid salt group, and III. the water soluble organic solvent of the white ink comprises glycol ether having a boiling point of from 200 degrees C. to 250 degrees C.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
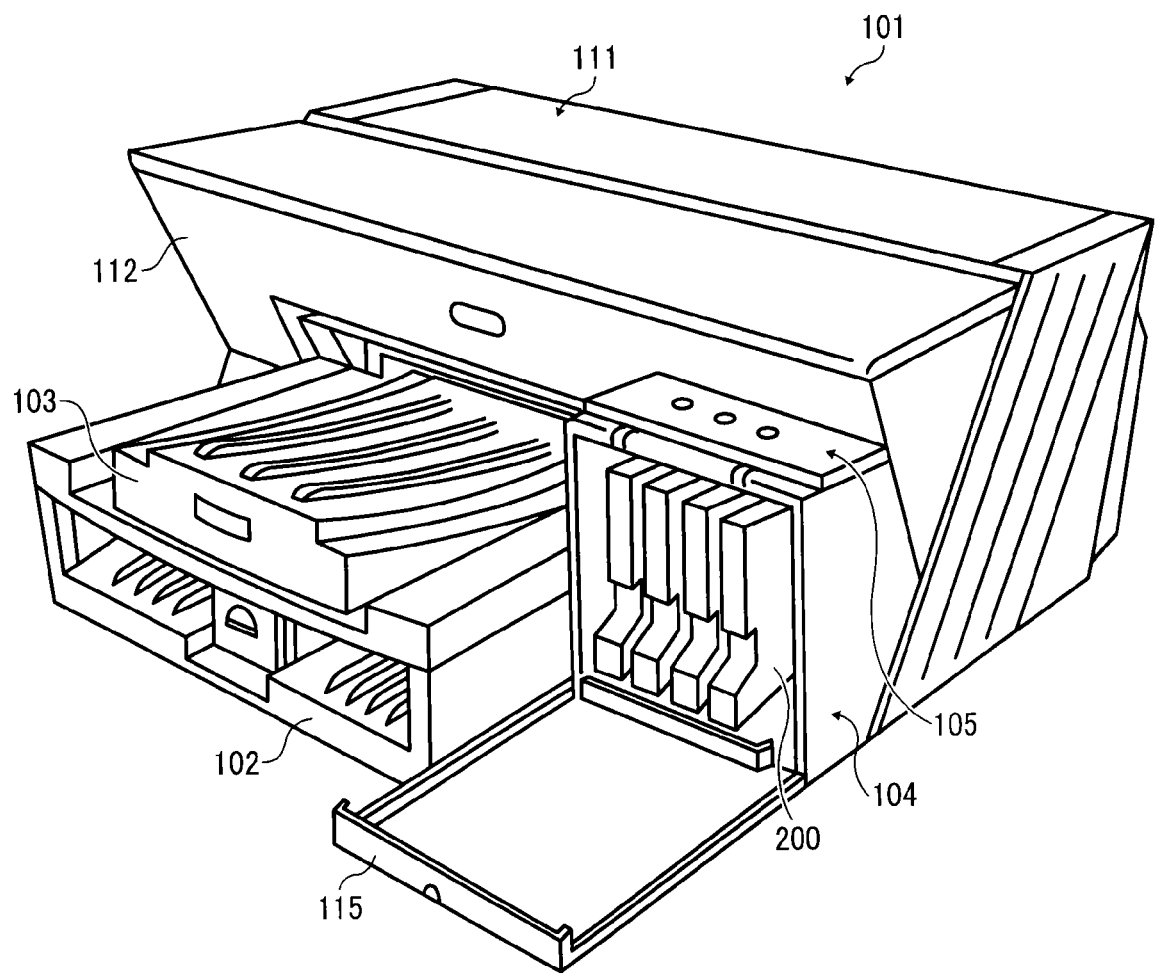
FIG. 1 is a diagram illustrating an example of inkjet recording devices.

As a result of investigation on blending in an aqueous ink and the composition of an ink set made by the present inventors, the present invention was made.

The present invention provides an improved ink set for inkjet with which images with high level of gloss images free from image blur can be printed when a color ink other than white ink is discharged onto the white ink on a substrate to which the white ink is already applied.

Embodiment 1 of the present disclosure is: an ink set for inkjet containing a white ink and one or more color inks other than the white ink, wherein the ink set satisfies the following I to III:

I. each ink contains water, a pigment, resin particulates, a water soluble organic solvent, and a silicone-based surfactant accounting for 1% by weight to 3% by weight of the ink, II. the pigment contained in each of the one or more color inks is a reformed pigment reformed by a geminal bisphosphonic acid group and/or a geminal bisphosphonic acid salt group, and III. the water soluble organic solvent of the white ink contains glycol ether having a boiling point of from 200 degrees C. to 250 degrees C.

The mechanism of forming such images is not clear. Although a reformed pigment having a geminalbis phosphonic acid group and/or a geminalbis phosphonic acid salt group demonstrates a high level of dispersion stability in an aqueous ink and contributes to forming a uniform layer (film), the pigment tends to agglomerate when a glycol ether-based solvent is added, thereby degrading dispersion stability. Therefore, when the modified pigment having a color other than the color of a white ink containing glycol ether is discharged on the white ink, the color ink agglomerates on the white ink and becomes sticky so that the fluidity of the ink lowers, thereby subduing image blur.

The embodiment 1 of the present disclosure is described in detail. Since the following embodiments 2 to 6 are included in the embodiments of the present disclosure, these are also described.

2. The ink set for inkjet mentioned in 1, wherein the reformed pigment contains at least one group selected from the group consisting of the following groups represented by Chemical Formulae 1 to 4:

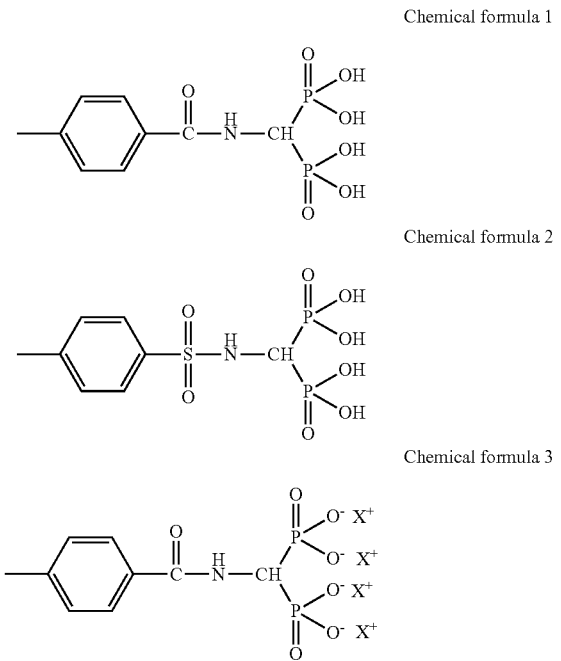

where X represents Li, K, Na, $NH_4$, $N(CH_3)_4$, $N(C_2H_5)_4$, $N(C_3H_7)_4$, or $N(C_4H_9)_4$.

where X represents Li, K, Na, $NH_4$, $N(CH_3)_4$, $N(C_2H_5)_4$, $N(C_3H_7)_4$, or $N(C_4H_9)_4$.

3. The ink set for inkjet mentioned in 1 or 2, wherein the glycol ether has a molecular weight of 170 or more.

4. The ink set for inkjet mentioned in any one of 1 to 3, wherein the total amount of 2,3-butanediol and propylene glycol accounts for 50% by weight or more of the water soluble organic solvent.

5. The ink set for inkjet mentioned in any one of 1 to 3, wherein the water soluble organic solvent has a boiling point 250 degrees C. or lower.

6. An inkjet recording method including:
    discharging the white ink of the ink set for inkjet of any one of 1 to 5 mentioned above to a substrate, and then discharging the one or more color inks other than the white ink of the ink set for inkjet onto the white ink on the substrate.

Any of the inks relating to the ink set of the present disclosure contains at least water, a pigment, resin particulates, a water soluble organic solvent, a silicone-based surfactant, and other optional additives. These ink components are sequentially described.

Pigment

Pigments are classified into organic pigments and inorganic pigments. These are selected depending on the color of ink.

Preferable specific examples of white pigments include, but are not limited to, titanium oxide, iron oxide, calcium oxide, barium sulfate, and aluminum hydroxide.

In addition, as the black pigment, carbon black (Pigment Black 7) is particularly preferable. Examples of carbon black available on market are Regal™, Black Pearls™ Elftex™, Monarch™, Mogul™, and Vulcan™ (all manufactured by Cabot Corporation).

Specific examples thereof include, but are not limited to, Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls L, Elftex 8, Monarch 1400, Monarch 1300, Monarch 1100, Monarch 1000, Monarch 900, Monarch 880, Monarch 800, Monarch 700, Mogul L, Regal 330, Monarch 400, Monarch 660, Vulcan P, SENSIJET Black SDP100 (SENSIENT), SENSIJET Black SDP 1000 (SENSIENT), and SENSIJET Black SDP 2000 (SENSIENT).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

As described above, in the present disclosure, the reformed pigment reformed by a geminal bisphosphonic acid group and/or a geminal bisphosphonic acid salt group is used as the pigment contained in each of the one or more color inks.

Reforming treatment of the surface of the pigment is described taking a case of geminalbis phosphonic acid group as an example. For example, the pigment can be reformed by the following method A or method B.

Method A 20 g of carbon black, 20 mmol of the compound represented by Chemical Formula 5 or 6 illustrated below, and 200 mL of water are mixed at room temperature by a Silverson Mixer (6,000 rpm). When an obtained slurry has a pH higher than 4, 20 mmol of nitric acid is added. 30 minutes later, 20 mmol of sodium nitrite dissolved in a minute amount of water is slowly added to the slurry. Furthermore, when the slurry is heated to 60 degrees C. while being stirred to conduct reaction for one hour, a reformed pigment in which the compound represented by Chemical Formula 5 or 6 is added to carbon black is obtained. Thereafter, by adjusting the pH to be 10 by NaOH aqueous solution, a dispersion element of reformed pigment is obtained 30 minutes later. Thereafter, subsequent to ultrafiltration by dialysis membrane using water followed by ultrasonic dispersion to obtain a dispersion element of reformed pigment in which the solid portion is concentrated.

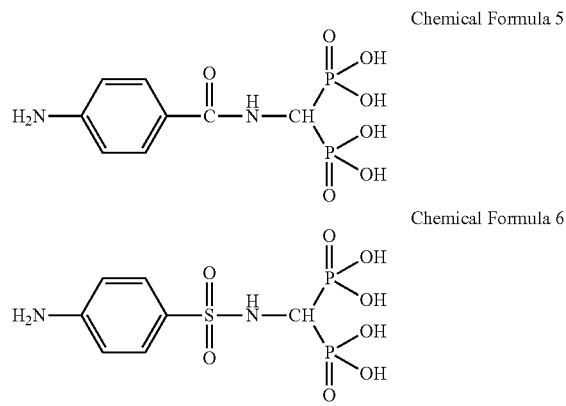

Chemical Formula 5

Chemical Formula 6

Method B 500 g of dried carbon black, 1 L of water, and one mol of the compound represented by Chemical Formula 5 or 6 are charged in Process All 4HV mixer (4 L) and vigorously stirred at 300 rpm for 10 minutes while being heated to 60 degrees C. Thereafter, 20% sodium nitrite aqueous solution (one mol equivalent based on the compound represented by Chemical Formula 5 or 6 in 15 minutes) is added thereto to conduct reaction for three hours under mixing and stirring while being heated to 60 degrees C.

Thereafter, subsequent to withdrawal of the reactant while diluting with water, it was subject to ultrafiltration by dialysis membrane using water followed by ultrasonic dispersion to obtain a dispersion element of reformed pigment in which the solid portion is concentrated. When the amount of coarse particles is unnecessarily excessive, it is desirable to remove them by a centrifugal, etc.

Optionally, it is suitable to add a pH regulator to the thus-obtained dispersion element of reformed pigment. It is possible to use the same pH regulators as those for the ink, which are described later. Of these, pH regulates having $Na^+$, $N(CH_3)^+$, $N(C_2H_5)_4^+$, $N(C_3H_7)_4^+$, and $N(C_4H_9)_{4+}$ are preferable.

When treated with such a pH regulator, at least a part of the compound represented by Chemical Formula 5 or 6 are changed to salts thereof (corresponding to compounds represents by Chemical Formula 3 or 4).

The surface area of a pigment is preferably from about 10 $m^2/g$ to about 1,500 $m^2/g$, more preferably from about 20 $m^2/g$ to about 600 $m^2/g$, and furthermore preferably about 50 $m^2/g$ to about 300 $m^2/g$.

Unless a pigment has such a desired surface area, it is suitable to reduce the size of the pigment or pulverize it by using, for example, a ball mill, a jet mill, or ultrasonic wave to have a relatively small particle diameter.

The volume average particle diameter ($D_{50}$) of a pigment in an ink is preferably from 10 nm to 300 nm and more preferably from 20 nm to 250 nm in terms of dispersion stability of pigment of an ink, discharging stability, image density, and productivity of ink.

The content of the pigment in an ink preferably ranges from about 0.1% by weight to about 10% by weight and more preferably from about 1% by weight to about 10% by weight in terms of image density, fixability, and discharging stability.

This pigment can be dispersed in an ink by a dispersion method using a surfactant, a dispersion method using a dispersible resin, a dispersion method coating the surface of the pigment with a resin, and a dispersion method forming a self-dispersible pigment by introducing a hydrophilic functional group into the surface of the pigment.

Resin Particulate

In the present disclosure, resin particulates in which a resin is dispersed in water is added.

There is no specific limit to the identity of the resin particulate. The resin particulate can be selected to each of a particular application. Specific examples thereof include, but are not limited to, emulsions of urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. Of these, in terms of fixability and ink stability, emulsions of urethane resins or acrylic-based resins are preferable. Moreover, a dispersant such as a surfactant can be optionally added to the resin particulate. In particular, a so-called self-emulsifiable resin particulate is preferable in terms of applied film's performance. It is preferable to contain an anionic group in an acid value range of from 5 mgKOH to 100 mgKOH/g in terms of water dispersability. To impart excellent scratch resistance and chemical resistance, it is particularly preferable that the acid value ranges from 5 mgKOH to 50 mgKOH/g. In addition, it is possible to obtain good hydrodispersion stability by using a carboxylic group, a sulfonic acid group, etc. as the anionic group. To introduce such an anionic group into a resin, it is suitable to use a monomer having such an anionic group.

Any suitably synthesized resin particulates and products available on market are also usable.

Specific examples of the products available on market include, but are not limited to, SUPERFLEX® 130 (polyether-based urethane resin particulate, manufactured by DAI-ICHI KOGYO SEIYAKU CO., LTD.), JONCRYL® 537 (acrylic resin particulate, manufactured by BASF SE), Microgel E-1002 and E-5002 (styrene-acrylic-based resin particulate, manufactured by Nippon Paint Co., Ltd.), Voncoat 4001 (acrylic-based resin particulate, manufactured by Dainippon Ink and Chemicals, Inc.), Voncoat 5454 (styrene-acrylic-based resin particulate, manufactured by Dainippon Ink and Chemicals, Inc.), SAE-1014 (styrene-acrylic-based resin particulate, manufactured by Nippon Zeon Co., Ltd.), and Saivinol SK-200 (acrylic-based resin particulate, manufactured by Saiden Chemical Industry Co., Ltd.), Primal AC-22 and AC-61 (acrylic-based resin particulate, manufactured by The Dow Chemical Company), NANOCRYL SBCX-2821 and 3689 (acrylic-silicone-based resin particulate, manufactured by Toyo Ink Co., Ltd.), and #3070 (methacrylate methyl polymer resin particulate, manufactured by MIKUNI COLOR LTD.).

In addition, with regard to the particle diameter of the resin particulate, considering the usage of these in an inkjet recording device, the volume average particle diameter is preferably from 10 nm to 1,000 nm and more preferably from 20 nm to 50 nm. When resin particulates have a volume average particle diameter of from 20 nm to 50 nm, the contact between the surface of the resin particulate dispersed in an ink and the silicone-based surfactant increases so that the disperability of the resin particulate increases and the smoothness of an ink layer is improved when the layer is formed. As a result, a higher level of gloss is obtained.

The volume average particle diameter can be measured by using a particle size analyzer (Microtrac MODEL UPA 9340, manufactured by Nikkiso Co., Ltd.).

The content of the resin particulate in an ink is preferably from 1% by weight to 10% by weight in terms of fixability and ink stability and more preferably from 5% by weight to 10% by weight to improve smoothness of an ink layer, obtain a high level of image gloss, and ameliorate fixability to a substrate.

Moreover, when the content of the resin in an ink is increased to the content of the pigment or more, preferably at least the double, it is possible to obtain a higher level of image gloss and abrasion resistance.

Water Soluble Organic Solvent

There is no specific limit to the selection the water soluble organic solvent and it can be any known solvent.

Specific examples thereof include, but are not limited to, polyols such as ethylene glycol, propylene glycol, 1,2-propane glycol, 1,3-propane glycol, 1,2-butanediol, 1,3-butanediol, 2,3-butanediol, 1,4-butanediol, 2-methyl-2,4-pentanediol, diethylene glycol, triethylene glycol, dipropylene glycol, 2,2-dimethyl-1,3-propane diol, 2-methyl-1,3-propane diol, 1,2-pentanediol, 2,4-pentanediol, 1,5-pentanediol, 1,6-hexanediol, 2-ethyl-1,3-hexanediol, and 2,5-hexanediol, polyol alkyl ethers such as dipropylene glycol monomethyl ether, propylene glycol-n-butyl ether, propylene glycol-t-butyl ether, diethylene glycol methyl ether, diethylene glycol ethyl ether, diethylene glycol benzyl ether, ethylene glycol-n-propyl ether, ethylene glycol-n-butyl ether, dipropylene glycol-n-propyl ether, tripropylene glycol methyl ether, tripeopylene glycol-n-propyl ether, propylene glycol phenyl ether, triethylene glycol methyl ether, triethylene glycol ethyl ether, triethylene glycol butyl ether, diethylene glycol-n-hexyl ether, and ethylene glycol phenyl ether; esters such as ethy lactate; nitrogen-containing heterocyclic compounds such as N-methyl-2-pyrroridone, N-hydroxyethyl-2-pyrroridone, 2-pyrroridone, 1,3-dimethyl imidazolidinone, and ε-caprolactam; amides such as formamide, N-methyl formamide, and N,N-dimethyl form amide; amines such as monoethanolamine, diethanolamine, triethanolamine, monoethylamine, diethylamine, and triethylamine; and sulfur-containing compounds such as dimethyl sulfoxide, sulforane, thiodiethanol, and thiodiglycol.

These can be used alone or two or more kinds thereof can be used in combination.

In the present disclosure, the white ink contains at least one kind of glycol ether having a boiling point of from 200 degrees C. to 250 degrees C. as the water soluble organic solvent. Due to glycol ether, when an ink having a different color other than white is discharged on the white ink, agglomeration of the reformed pigment in the ink having a different color is promoted. Therefore, in the case of superimposition, high performance is possible.

Specific examples of glycol ethers having a boiling point of from 200 degrees C. to 250 degrees C. include, but are not limited to, diethylene glycol ethylether (boiling point: 202 degrees C., molecular weight: 134.2), diethylene glycol monoisopropylether (boiling point: 207 degrees C., molecular weight: 148.2), diethylene glycol monoisobutylether (boiling point: 220 degrees C., molecular weight: 162.2), triethylene glycol dimethylether (boiling point: 216 degrees C., molecular weight: 178.2), diethylene glycol monobutylether (boiling point: 230 degrees C., molecular weight: 162.2), tripropylene glycol monomethylether (boiling point: 242 degrees C., molecular weight: 206.3), and triethylene glycol monomethylether (boiling point: 249 degrees C., molecular weight: 164.2).

Furthermore, of these, glycol ether having a molecular weight of 170 or greater particularly promotes agglomeration of the reformed pigment so that quality images are produced.

The total content of the water soluble organic solvent in an ink is preferably from 20% by weight to 70% by weight and more preferably from 30% by weight to 60% by weight. When the total amount is 20% by weight or more, the ink is not easily dried so that the discharging stability thereof becomes good. When it is 70% by weight or less, the viscosity of the ink remains not so high, which is advantageous in terms of ink discharging.

In addition, a mixture of propylene glycol (boiling point: 188 degrees C.) and 2,3-butanediol (boiling point: 183 degrees C.) is preferable as the water soluble organic solvent to obtain a higher grade of image gloss. The content of the water soluble organic solvent in an ink is preferably from 3% by weight to 35% by weight and more preferably from 5% by weight to 25% by weight. Moreover, when the total amount of propylene glycol and 2,3-butanediol (i.e., the amount of propylene glycol and/or 2,3-butanediol) accounts for 50% by weight or more of the water soluble organic solvent contained in an aqueous ink, high level of image gloss is achieved and drying property is furthermore improved, which is preferable.

In addition, when no water soluble organic solvent having a boiling point higher than 250 degrees C. is contained, drying properties are further improved.

Silicone-Based Surfactant

The silicone-based surfactant accounts for 1% by weight to 3% by weight of the ink. Due to this, when white ink is directly printed on a non-permeating medium (substrate) and an ink having a different color is printed on the white ink, the wettability to the substrate and the white ink is excellent and the discharged ink forms a smooth layer so that high level of gloss is achieved. When the content of the silicone-based surfactant is less than 1% by weight, the ink is not easily discharged, which leads to production of defective images having streaks or low image gloss. When the content is greater than 3% by weight, fusion inhibition of a resin particulate tends to occur, the applied film has a low level of robustness.

There is no specific limit to the silicone-based surfactant. The silicone-based surfactant can be suitably selected to a particular application. Of these, silicone-based surfactants which are not dissolved in a high pH are preferable. Specific examples thereof include, but are not limited to, side chain-modified polydimethyl siloxane, both end-modified polydimethyl siloxane, one end-modified polydimethyl siloxane, and side chain both end-modified polydimethyl siloxane. As the modification group, it is particularly preferable to select a modified group having a polyoxyethylene group or polyoxyethylene polyoxypropylene group because these demonstrate good properties as aqueous surfactants.

It is possible to use a polyether-modified silicone-based surfactant as the silicone-based surfactant. A specific example thereof is a compound in which a polyalkylene oxide structure is introduced into the side chain of the Si portion of dimethyl siloxane.

Optionally, surfactants other than the silicone-based surfactant can be used in combination. Examples thereof are amphoteric surfactants, nonionic surfactants, anionic surfactants, etc.

Of these, fluorine-containing surfactants are preferable. Specific examples thereof include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain because these have low foaming property. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain.

Counter ions of salts in these salts are, for example, Li, Ha, K, $NH_4$, $NH_3CH_2CH_2OH$, $NH_2(CH_2CH_2OH)_2$, and $NH(CH_2CH_2OH)_3$.

The total content of the surfactant in an ink preferably ranges from 1% by weight to 5% by weight in terms of discharging stability, image quality, and image robustness.

Other Additives

Examples of other additives include preservatives and fungicides, corrosion inhibitors, and pH regulators.

Specific examples of the preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

Suitably selected pH regulators can adjust the pH to a desired value without having an adverse impact on an ink to be formulated. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink for use in the present disclosure can be manufactured by adding water to the formulation mentioned above by optional stirring and mixing. A stirrer using a typical stirring blade, a magnetic stirrer, a high performance disperser etc., can be used for the mixing and stirring. However, it is not limited to particular methods. Known methods are employed to particular applications.

Inkjet Recording Method

The inkjet recording method of the present disclosure includes a step of discharging a white ink on a substrate and thereafter a step of discharging an ink having a different color on the white ink on the substrate.

In the ink discharging process, a stimulus is applied to an ink to discharge it for image printing. The device to discharge the ink is appropriately selected to particular applications without any limitation. A specific example thereof is a recording head (ink discharging head). In particular, an ink discharging device is preferable which has a head having multiple nozzle arrays and a sub-tank that accommodates an ink supplied from an ink cartridge and supplies the liquid to the head. It is preferable that the sub-tank mentioned above has a negative pressure producing device to produce a negative pressure in the sub-tank, an air releasing device to release air in the sub-tank, and a detector to detect whether there is ink therein by the difference of electric resistances.

Such a stimulus can be generated by a stimulus generating device. There is no specific limit to the stimulus mentioned above, which can be selected to a particular application. For example, heat (temperature), pressure, vibration, and light can be suitably used as the stimulus. These may be used alone or in combination of two or more thereof. Of these, heat and pressure are preferable.

Examples of the device to generate such a stimulus include a heater, a pressurization device, a piezoelectric element, a vibrator, an ultrasonic oscillator, light, etc.

Specific examples thereof include, but are not limited to, a piezoelectric actuator such as the piezoelectric element, a thermal actuator that utilizes a phase change caused by film boiling of liquid using an electric heat conversion element such as a heat generating resistance, a shape-memory alloy actuator that uses the metal phase change due to temperature change, and an electrostatic actuator that utilizes an electrostatic force.

There is no specific limit to how the ink is discharged, which can be determined depending on the kind of stimuli mentioned above.

For example, in a case in which "heat" is applied as the stimulus, a method can be used which includes applying thermal energy corresponding to recording signals to ink in a recording head by, for example, a thermal head to generate foams in the ink, thereby discharging and spraying the ink as droplets from the nozzles of the recording head due to the pressure of the foam. In addition, in a case in which the stimulus is "pressure", for example, a method can be used in which ink is discharged and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

Of these, a method discharging an ink by applying a voltage to a piezoelectric element is preferable. No heat is generated in the piezoelectric system, which is advantageous to discharge an ink containing a resin. This is particularly suitable to subdue clogging in nozzles when an ink containing a small amount of wetting agent is used. In addition, to prevent non-firing of ink ascribable to clogging of nozzles, it is preferable to conduct false scanning by applying to a piezoelectric element a voltage above which ink is fired.

Furthermore, it is preferable to operate discharging of an ink to an ink storing portion before false scanning reaching an amount corresponding to one page printing. In addition, it is preferable to include a scraper to scrape off the ink fixated on a receiver of false discharging. Using a wiper or a cutter is preferable as the scraper.

In addition, in the present disclosure, it is possible to provide a heater to heat a substrate to increase wet-spreading of the white ink discharged on the substrate and the ink having a different color discharged on the white ink.

As the heater (heating device), one or more known heating devices are suitably selected for use. For example, the heating device for a forced-air heating, radiation heating, conductive heating, high frequency drying, or microwave drying can be used. Such a heating device can be installed in a typical inkjet printer or externally attached thereto.

FIG. 1 is a schematic diagram illustrating an example of inkjet recording devices.

The following description applies to a serial type (shuttle type) in which a carriage scans but is also true for a line-type inkjet recording device having a line type head.

The inkjet recording device 101 illustrated in FIG. 1 has a sheet feeder tray 102 to accommodate a substrate placed in the inkjet recording device 101, an ejection tray 103 mounted on the inkjet recording device 101 to store the substrate on which images are recorded (formed), and an ink cartridge installation unit 104. On the upper surface of the ink cartridge installation unit 104 is arranged an operating portion 105 including operation keys, a display, etc. The ink cartridge installation unit 104 has a front cover 115 that is openable and closable to detach and attach an ink cartridge 200. The reference numeral 111 represents an upper cover and, 112, the front surface of the front cover.

Figure 2:
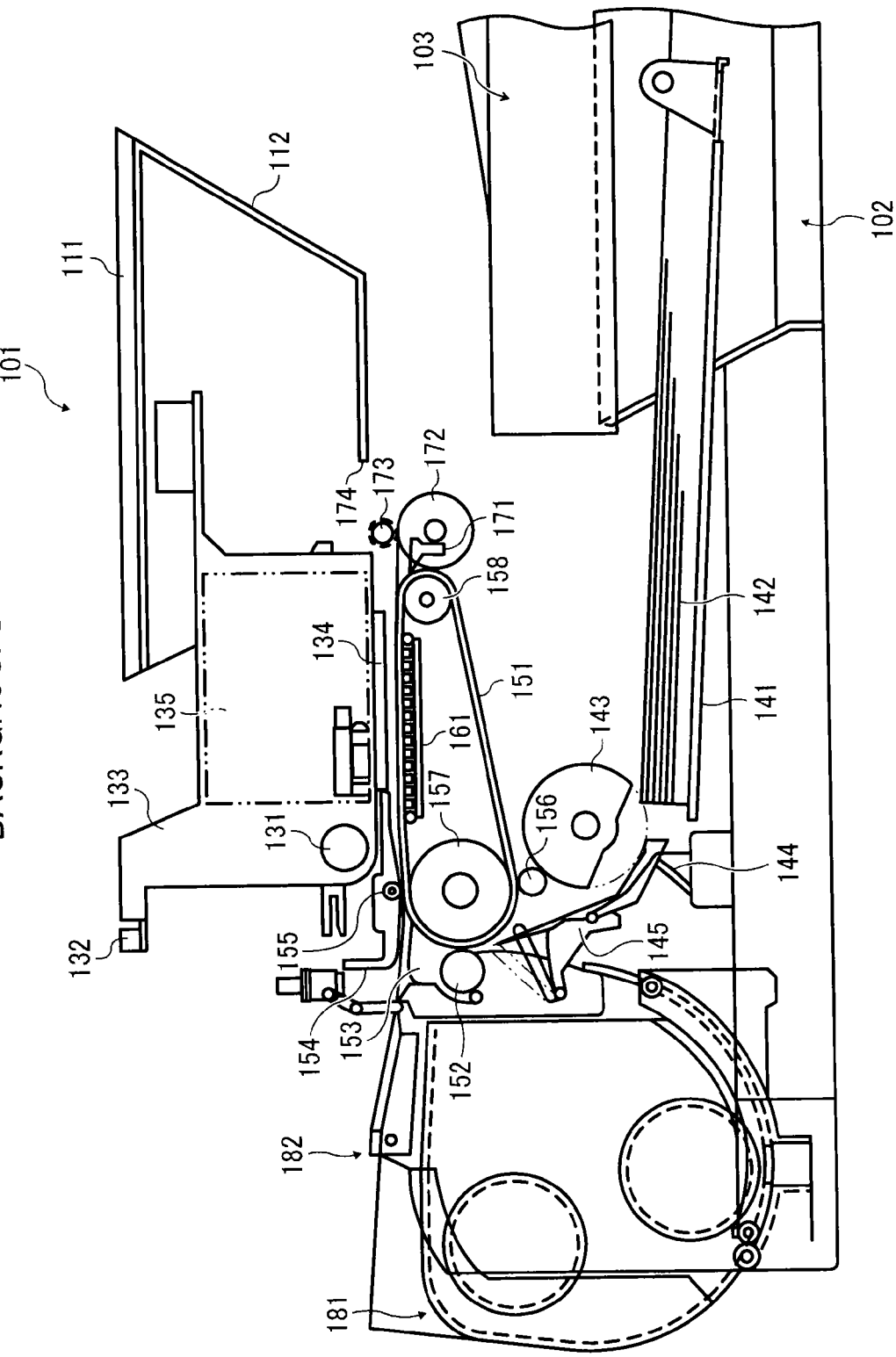
FIG. 2 is a view illustrating the internal structure of the inkjet recording device illustrated in FIG. 1

Inside the inkjet recording device 101, as illustrated in FIG. 2, a stay 132 and a guide rod 131 serving as a guiding member that laterally bridges side plates provided on the right side and left side hold a carriage 133 slidably movable in the main scanning direction. A main scanning motor moves the carriage 133 for scanning.

The carriage 133 has a recording head 134 having five inkjet recording heads that discharge ink droplets of each color of yellow (Y), cyan (C), magenta (M), black (Bk), and white (W) while multiple ink discharging mouths are arranged in the direction crossing the main scanning direction with the ink droplet discharging direction downward.

As the heads for inkjet recording that form the recording head 134, it is possible to use a device having an stimulus-generating device to eject (discharge) an ink such as a piezoelectric actuator such as a piezoelectric element, a thermal actuator that utilizes the phase change caused by film boiling of liquid by using an electric heat conversion element such as a heat resistance element, a shape-memory alloy actuator that uses the metal phase change due to the temperature change, and an electrostatic actuator that uses an electrostatic force as a stimulus generating device to discharge the ink. In addition, it is also possible to have a heating mechanism to heat an ink in the recording head 134.

Moreover, the carriage 133 has sub tanks 135 for each color to supply each color ink to the recording head 134. The ink is supplied and replenished to the sub-tank 135 from the ink cartridge 200 mounted onto the ink cartridge installation unit 104 via an ink supplying tube.

A sheet feeding unit to feed a substrate 142 loaded on a substrate loader (pressure plate) 141 of the sheet feeder tray 102 includes a half-moon shape roller (sheet feeding roller 143) to separate and feed the substrate 142 one by one from the substrate loader 141 and a separation pad 144. The separation pad 144 faces the sheet feeding roller 143 and is made of a material having a large friction index and biased towards the sheet feeding roller 143.

A transfer unit to transfer the substrate 142 fed from the sheet feeding unit below the recording head 134 includes a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 by which the substrate 142 moves on the transfer belt 151 by changing the transfer direction of the sheet 142 being sent substantially vertically upward by substantially 90°, a front end pressure roller 155 biased towards the transfer belt 151 by a pressing member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 has, for example, a top layer serving as a substrate adsorption surface made of a resin material such as a copolymer (ETFE) of tetrafluoroethylene and ethylene with no resistance treatment having a thickness about 40 µm and a bottom layer (intermediate resistance layer, earth layer) made of the same material as that for the top layer with resistance treatment with carbon.

On the rear side of the transfer belt 151, a guiding member 161 is arranged corresponding to the printing area by the recording head 134. An ejection unit to eject the substrate 142 on which images are recorded by the recording head 134 includes a separation claw 171 to separate the substrate 142 from the transfer belt 151, a sheet-ejection roller 172, and a sheet ejection roller 173. The substrate 142 is dried by heat wind by a fun heater 174 and thereafter output to a sheet ejection tray 103 arranged below the sheet-ejection roller 172.

A duplex printing sheet feeding unit 181 is mounted in a detachable and attachable manner to the rear side of the inkjet recording device 101.

The duplex printing sheet feeding unit 181 takes in and reverses the substrate 142 that is returned by the reverse rotation of the transfer belt 151 and feeds it again between the counter roller 152 and the transfer belt 151. A bypass sheet feeding unit 182 is provided on the upper surface of the duplex printing sheet feeding unit 181

In this inkjet recording device, the substrate 142 is separated and fed from the sheet feeding unit one by one substantially vertically upward, guided by the guide 145, and transferred while being pinched between the transfer belt 151 and the counter roller 152. Furthermore, the front end of the substrate 142 is guided by the transfer guide 153 and pressed against the transfer belt 151 by the front end pressure roller 155 to change the transfer direction substantially 90°. Since the transfer belt 151 is charged by the charging roller 156 at this point in time, the sheet 142 is electrostatically adsorbed to the transfer belt 151 and transferred. By driving the recording head 134 in response to the image signal by moving the carriage 133, the ink droplet is discharged to the substrate 142 not in motion to record an image in an amount of one line and thereafter the substrate 142 is transferred in a predetermined amount to be ready for the recording for the next line. In addition, when recording with the ink having a different color other than white, it is possible to transfer the substrate 142 with a predetermined amount after the droplets of the white ink are discharged onto the substrate 142 to record an image equivalent to a single line and sequentially droplets of the ink having a different color are recorded on the white ink equivalent to the amount of the single line. On receiving a signal indicating that the recording has completed or the rear end of the substrate 142 has reached the image recording area, the recording operation stops and the substrate 142 is ejected to the sheet-ejection tray 103.

The target of the image printing conducted by the inkjet recording method of the present disclosure is preferably non-porous substrates. This non-porous substrate is a resin film, laminated paper, coated paper, etc. having a surface formed of non-porous materials such as transparent or colored vinyl chloride film, polyethylene terephthalate (PET) film, acrylic film, polypropylene film, polyimide film, and polystyrene film and free from paper components such as wood pulp paper, Japanese paper, synthesized pulp paper, and synthesized fiber paper.

The inkjet recording method of the present disclosure can be applied to various recording by an inkjet recording system, for example, printers, facsimile machines, photocopiers, and printers/photocopiers/multifunction peripherals for inkjet recording in particular.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Preparation of Dispersion Element 1 of Surface Reformed Black Pigment 100 g of Black Pearls™ 1000 (carbon black having a BET specific surface area of 343 m²/g and a DBPA of 105 ml/100 g, manufactured by Cabot Corporation), 100 milimole of the compound represented by Chemical Formula 5, and 1 litter of water were mixed by a Silverson Mixer at 6,000 rpm in room temperature environment. 30 minutes later, 100 mmol of sodium nitrite dissolved in a minute amount of water was slowly added to the thus-obtained mixture. Furthermore, the resultant was heated to 60 degrees C. while being stirred to conduct reaction for one hour to obtain a reformed pigment in which the compound represented by Chemical Formula 5 was added to carbon black. Thereafter, by adjusting the pH to be 10 by NaOH aqueous solution, a dispersion element of the reformed pigment was obtained 30 minutes later. By this pH adjustment, at least a part of the compound represented by Chemical Formula 5 had become a compound having a group corresponding to Chemical Formula 3 in which $X^+$ is Nat Chemical Formula 5

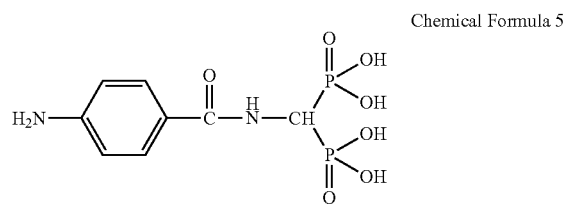 [SMILES: Nc1ccc(C(=O)NC(P(=O)(O)O)P(=O)(O)O)cc1]

Thereafter, subsequent to ultrafiltration by dialysis membrane using the dispersion element of the reformed pigment and water followed by ultrasonic dispersion, Dispersion element 1 of reformed pigment having a solid portion accounting for 20% was obtained.

The surface treatment level was 0.75 milimole/g, the volume average particle diameter ($D_{50}$) as measured by a particle size distribution measuring instrument (NANO-TRAC UPA-EX150, manufactured by NIKKISO CO., LTD.) was 120 nm, the content of sodium ion as measured by an ion meter (IM-32P, manufactured by DKK-TOA CORPORATION) was 27,868 ppm, and the content of phosphorous (P) by elementary analysis was 2.31%.

Preparation of Dispersion Element 1 of Surface Reformed Magenta Pigment

A dispersion element 1 of the surface reformed magenta pigment having a solid portion accounting for 20% was obtained in the same manner as in preparation of the dispersion element 1 of the surface reformed black pigment except that carbon black was changed to Pigment Red 122 (manufactured by Sun Chemical Corporation) and the amount of the compound represented by Chemical Formula 5 was changed to 50 mmol.

The surface treatment level of the reformed pigment was 0.60 mmole/g, the volume average particle diameter ($D_{50}$) and the content of sodium ion as measured in the same manner as the dispersion element 1 of the surface reformed black pigment were 111 nm and 14,553 ppm, respectively, and the content of phosphorous (P) by elementary analysis was 1.43%.

Preparation of Dispersion Element 1 of Surface Reformed Cyan Pigment

A dispersion element 1 of the surface reformed cyan pigment having a solid portion accounting for 20% was obtained in the same manner as in preparation of the dispersion element 1 of the surface reformed black pigment except that 100 g of carbon black was changed to 690 g of SMART Cyan 3154BA (Pigment Blue 15:4 surface treated dispersion element, solid portion of pigment: 14.5%, manufactured by SENSIENT), the amount of the compound represented by Chemical Formula 5 was changed to 50 mmol, and the amount of water was changed to 500 mL.

The surface treatment level of the reformed pigment was 0.65 mmole/g, the volume average particle diameter ($D_{50}$) and the content of sodium ion as measured in the same manner as the dispersion element 1 of the surface reformed black pigment were 104 nm and 20,334 ppm, respectively, and the content of phosphorous (P) by elementary analysis was 1.81%.

Preparation of Dispersion Element 1 of Surface Reformed Yellow Pigment

A dispersion element 1 of the surface reformed yellow pigment having a solid portion accounting for 20% was obtained in the same manner as in preparation of the dispersion element 1 of the surface reformed black pigment except that 100 g of carbon black was changed to 690 g of SMART Yellow 3074BA (Pigment Yellow 74 surface treated dispersion element, solid portion of pigment: 14.5%, manufactured by SENSIENT), the amount of the compound represented by Chemical Formula 5 was changed to 50 mmol, and the amount of water was changed to 500 mL.

The surface treatment level of the reformed pigment was 0.4 mmole/g, the volume average particle diameter ($D_{50}$) and the content of sodium ion as measured in the same manner as the dispersion element 1 of the surface reformed black pigment were 98 nm and 10,012 ppm, respectively, and the content of phosphorous (P) by elementary analysis was 1.05%.

Preparation of Dispersion Element 2 of Surface Reformed Pigment of Black, Magenta, Cyan and Yellow Each dispersion element 2 of pigment of black, magenta, cyan, and yellow having a pigment solid portion accounting for 20% was obtained in the same manner as in the dispersion element 1 of pigment of black, magenta, cyan, and yellow, respectively, except that the compound represented by Chemical Formula 5 was changed to the compound represented by Chemical Formula 6.

Chemical Formula 6

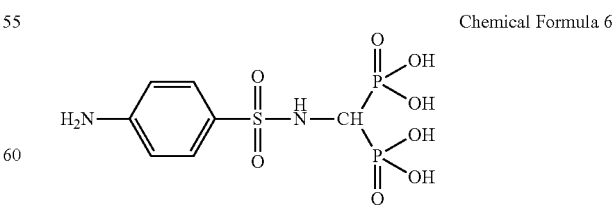

The volume average particle diameters ($D_{50}$) and the contents of sodium ion as measured in the same manner as the dispersion element 1 of the surface reformed black pigment were 124 nm (black), 108 nm (magenta), 108 nm (cyan), 100 nm (yellow), 28,954 ppm (black), 15,432 ppm (magenta), 20,225 ppm (cyan), and 11,058 ppm (yellow) and the contents of phosphorous (P) by elementary analysis were 2.23% (black), 1.56% (magenta), 1.78% (cyan), and 1.21% (yellow).

Preparation of Dispersion Element 3 of Surface Reformed Pigment of Black, Magenta, Cyan and Yellow Each dispersion element 3 of pigment of black, magenta, cyan, and yellow having a pigment solid portion accounting for 20% was obtained in the same manner as in the dispersion element 1 of pigment of black, magenta, cyan, and yellow, respectively, except that NaOH aqueous solution was changed to tetramethyl ammonium hydroxide.

By this pH adjustment, at least a part of the compound represented by Chemical Formula 5 had become the compound having a group corresponding to Chemical Formula 3 in which $X^+$ is $N(CH_3)_4^+$.

The volume average particle diameters ($D_{50}$) as measured in the same manner as the dispersion element 1 of the surface reformed black pigment were 127 nm (black), 104 nm (magenta), 110 nm (cyan), and 106 nm (yellow) and the contents of phosphorous (P) by elementary analysis were 0.57% (black), 0.26% (magenta), 0.41% (cyan), and 0.22% (yellow).

Preparation of Dispersion Element 4 of Surface Reformed Pigment of Black, Magenta, Cyan and Yellow Each dispersion element 4 of pigment of black, magenta, cyan, and yellow having a pigment solid portion accounting for 20% was obtained in the same manner as in the dispersion element 1 of pigment of black, magenta, cyan, and yellow, respectively, except that the compound represented by Chemical Formula 5 was changed to the compound represented by Chemical Formula 6 and NaOH aqueous solution was changed to tetramethyl ammonium hydroxide.

By this pH adjustment, at least a part of the compound represented by Chemical Formula 6 had become the compound having a group corresponding to Chemical Formula 4 in which $X^+$ is $N(CH_3)_4^+$.

The volume average particle diameters ($D_{50}$) as measured in the same manner as the dispersion element 1 of the surface reformed black pigment were 126 nm (black), 101 nm (magenta), 114 nm (cyan), and 102 nm (yellow) and the contents of phosphorous (P) by elementary analysis were 0.55% (black), 0.27% (black), 0.45% (cyan), and 0.26% (yellow).

Preparation of Dispersion Element 5 of Surface Reformed Pigment of Black, Magenta, Cyan and Yellow Each dispersion element 5 of pigment of black, magenta, cyan, and yellow having a pigment solid portion accounting for 20% was obtained in the same manner as in the dispersion element 1 of pigment of black, magenta, cyan, and yellow, respectively, except that the compound represented by Chemical Formula 5 was changed to the compound represented by Chemical Formula 6 and NaOH aqueous solution was changed to tetrabutyl ammonium hydroxide.

By this pH adjustment, at least a part of the compound represented by Chemical Formula 6 had become the compound having a group corresponding to Chemical Formula 4 in which $X^+$ is $N(C_4H_9)_4^+$.

The volume average particle diameters ($D_{50}$) as measured in the same manner as the dispersion element 1 of the surface reformed black pigment were 121 nm (black), 102 nm (magenta), 113 nm (cyan), and 105 nm (yellow) and the contents of phosphorous (P) by elementary analysis were 0.56% (black), 0.23% (magenta), 0.46% (cyan), and 0.24% (yellow).

Preparation of Dispersion Element 6 of Surface Reformed Pigment of Black, Magenta, Cyan and Yellow Each dispersion element 6 of pigment of black, magenta, cyan, and yellow having a pigment solid portion accounting for 20% was obtained in the same manner as in the dispersion element 1 of pigment of black, magenta, cyan, and yellow, respectively, except that NaOH aqueous solution was changed to tetraethyl ammonium hydroxide.

By this pH adjustment, at least a part of the compound represented by Chemical Formula 5 had become the compound having a group corresponding to Chemical Formula 3 in which $X^+$ is $N(C_2H_5)_4^+$.

The volume average particle diameters ($D_{50}$) as measured in the same manner as the dispersion element 1 of the surface reformed black pigment were 124 nm (black), 101 nm (magenta), 112 nm (cyan), and 104 nm (yellow) and the contents of phosphorous (P) by elementary analysis were 0.59% (black), 0.26% (magenta), 0.42% (cyan), and 0.25% (yellow).

Preparation of Dispersion Element 7 of Surface Reformed Pigment of Black,

Magenta, Cyan and Yellow

Each dispersion element 7 of pigment of black, magenta, cyan, and yellow having a pigment solid portion accounting for 20% was obtained in the same manner as in the dispersion element 1 of pigment of black, magenta, cyan, and yellow, respectively, except that NaOH aqueous solution was changed to tetrapropyl ammonium hydroxide.

By this pH adjustment, at least a part of the compound represented by Chemical Formula 5 had become the compound having a group corresponding to Chemical Formula 3 in which $X^+$ is $N(C_3H_7)_4^+$.

The volume average particle diameters ($D_{50}$) as measured in the same manner as the dispersion element 1 of the surface reformed black pigment were 122 nm (black), 100 nm (magenta), 115 nm (cyan), and 103 nm (yellow) and the contents of phosphorous (P) by elementary analysis were 0.55% (black), 0.23% (magenta), 0.43% (cyan), and 0.22% (yellow).

Preparation of Dispersion Element 8 of Surface Reformed Pigment of Black, Magenta, Cyan and Yellow Each dispersion element 8 of pigment of black, magenta, cyan, and yellow having a pigment solid portion accounting for 20% was obtained in the same manner as in the dispersion element 1 of pigment of black, magenta, cyan, and yellow, respectively, except that NaOH aqueous solution was changed to lithium hydroxide aqueous solution.

By this pH adjustment, at least a part of the compound represented by Chemical Formula 5 had become the compound having a group corresponding to Chemical Formula 3 in which $X^+$ is $Li^+$.

The volume average particle diameters ($D_{50}$) as measured in the same manner as the dispersion element 1 of the surface reformed black pigment were 120 nm (black), 108 nm (magenta), 113 nm (cyan), and 101 nm (yellow) and the contents of phosphorous (P) by elementary analysis were 0.51% (black), 0.20% (magenta), 0.47% (cyan), and 0.24% (yellow).

Preparation of Dispersion Element 9 of Surface Reformed Pigment of Black, Magenta, Cyan and Yellow Each dispersion element 9 of pigment of black, magenta, cyan, and yellow having a pigment solid portion accounting for 20% was obtained in the same manner as in the dispersion element 1 of pigment of black, magenta, cyan, and yellow, respectively, except that NaOH aqueous solution was changed to potassium hydroxide aqueous solution.

By this pH adjustment, at least a part of the compound represented by Chemical Formula 5 had become the compound having a group corresponding to Chemical Formula 3 in which $X^+$ is $K^+$.

The volume average particle diameters ($D_{50}$) as measured in the same manner as the dispersion element 1 of the surface reformed black pigment were 126 nm (black), 108 nm (magenta), 111 nm (cyan), and 100 nm (yellow) and the contents of phosphorous (P) by elementary analysis were 0.57% (black), 0.29% (magenta), 0.42% (cyan), and 0.26% (yellow).

Preparation of Dispersion Element 10 of Surface Reformed Pigment of Black, Magenta, Cyan and Yellow Each dispersion element 10 of pigment of black, magenta, cyan, and yellow having a pigment solid portion accounting for 20% was obtained in the same manner as in the dispersion element 1 of pigment of black, magenta, cyan, and yellow, respectively, except that NaOH aqueous solution was changed to ammonium hydroxide aqueous solution.

By this pH adjustment, at least a part of the compound represented by Chemical Formula 5 had become the compound having a group corresponding to Chemical Formula 3 in which $X^+$ is $NH_4^+$.

The volume average particle diameters ($D_{50}$) as measured in the same manner as the dispersion element 1 of the surface reformed black pigment were 120 nm (black), 105 nm (magenta), 117 nm (cyan), and 103 nm (yellow) and the contents of phosphorous (P) by elementary analysis were 0.51% (black), 0.23% (magenta), 0.47% (cyan), and 0.21% (yellow).

Preparation of Dispersion Element 11 of Surface Reformed Black Pigment 100 g of carbon black (Black Pearls™, BET specific surface area: 343 $m^2/g$, DBPA 105 mL/100 g, manufactured by Cabot Corporation) was added to 3,000 mL of 2.5 N sodium sulfate followed by stirring at 300 rpm at 60 degrees C. Subsequent to reaction for ten hours for oxidation treatment, a reformed pigment in which a carboxylic acid group was imparted to the surface of carbon black was obtained. The reaction liquid was filtrated and the thus-filtered carbon black was neutralized by sodium hydroxide solution followed by ultra-filtration. Thereafter, subsequent to ultrafiltration by dialysis membrane using water followed by ultrasonic dispersion, Dispersion element 11 of reformed pigment having a solid portion accounting for 20% was obtained.

Preparation of Dispersion Element 11 of Surface Reformed Magenta Pigment

A dispersion element 11 of the surface reformed magenta pigment having a solid portion accounting for 20% was obtained in the same manner as in preparation of the dispersion element 11 of the surface reformed black pigment except that carbon black was changed to Pigment Red 122 (manufactured by Sun Chemical Corporation).

Preparation of Dispersion Element 11 of Surface Reformed Cyan Pigment

A dispersion element 11 of the surface reformed cyan pigment having a solid portion accounting for 20% was obtained in the same manner as in preparation of the dispersion element 11 of the surface reformed black pigment except that carbon black was changed to copper phthalocyanine (C.I. Pigment Blue 15:4, Product name: LX4033, manufactured by TOYO INK CO., LTD.).

Preparation of Dispersion Element 11 of Surface Reformed Yellow Pigment

A dispersion element 11 of the surface reformed yellow pigment having a solid portion accounting for 20% was obtained in the same manner as in preparation of the dispersion element 11 of the surface reformed black pigment except that carbon black was changed to a yellow pigment (Pigment Yellow 74, Product name: Yellow No. 46, manufactured by Dainichiseika Color & Chemicals Mfg. Co., Ltd.).

Preparation of Dispersion Element of Polymer Particulate Having Black Pigment Preparation of Polymer Solution A After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed followed by heating the system to 65° C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone was dripped to the flask in two and a half hours. Subsequently, a liquid mixture of 0.8 g of azobis methyl valeronitrile and 18 g of methylethyl ketone was dripped to the flask in half an hour.

After one-hour aging at 65° C., 0.8 g of azobismethyl valeronitrile was added followed by further one-hour aging. After the reaction was complete, 364 g of methylethyl ketone was added to the flask to obtain 800 g of a polymer solution A having a concentration of 50%.

Preparation of Dispersion Element of Polymer Particulate Having Black Pigment 28 g of the polymer solution A, 42 g of C.I. carbon black (FW100, manufactured by Degussa AG), 13.6 g of 1 mol/1 potassium hydroxide solution, 20 g of methylethyl ketone, and 13.6 g of deionized water were sufficiently stirred followed by mixing and kneading with a roll mill. The obtained paste was charged into 200 g of deionized water followed by sufficient stirring. Methylethyl ketone and water were distilled away using an evaporator and coarse particles were removed by filtrating the thus-obtained liquid dispersion with a polyvinylidene fluoride membrane filter having an average hole diameter of 5.0 μm under pressure to obtain a dispersion element of polymer particulate containing black pigment having a solid portion in an amount of 15 percent with a solid portion concentration of 20 percent.

Preparation of Dispersion Element of Polymer Particulate Containing Pigment of Magenta, Cyan, and Yellow Each of dispersion elements of polymer particulate containing pigment of each of magenta, cyan, and yellow having a solid portion in an amount of 15 percent with a solid portion concentration of 20 percent was obtained in the same manner as in the preparation of the dispersion element of polymer particulate containing black pigment except that carbon black was changed to each of the following pigments.

Magenta pigment: Pigment Red 122, manufactured by Sun Chemical Corporation

Cyan pigment: Copper phthalocyanine pigment (C.I. Pigment Blue 15:4, Product name: LX4033, manufactured by TOYO INK CO., LTD.)

Yellow pigment (C.I. Pigment Blue 74, Product name: Yellow No. 46, manufactured by Dainichiseika Color & Chemicals Mfg. Co., Ltd.)

Preparation of Dispersion Element of White Pigment 25 g of titanium oxide (STR-100W, manufactured by Sakai Chemical Industry Co., Ltd.), 5 g of Pigment dispersant (TEGO Dispers 651, manufactured by Evonik Japan Co., Ltd.), and 70 g of water were mixed followed by dispersion using a bead mill (research labo, manufactured by Shinmaru Enterprises Corporation) with 0.3 mm Φ zirconia beads and a filling ratio of 60% at 8 m/s for five minutes to obtain a dispersion element of white pigment having a pigment solid portion accounting for 25% and a solid portion concentration of 30%.

Example 1

The following recipe was mixed and stirred and thereafter filtered by a 0.2 μm polypropylene filter to prepare each ink of black, magenta, cyan, and yellow.

Black Ink

| | |
|---|---|
| Liquid dispersion 1 of surface reformed black pigment (solid portion 20%, solvent: water): | 20% |
| Polyether-based Urethane Resin Paniculate (SUPERFLEX ® 130, solid portion 35%, solvent: water, manufactured by DAI-ICHI KOGYO SEIYAKU CO., LTD.): | 20% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 10% |
| Water: | 17.9% |
| Preservatives and fungicides (PROXEL LV, manufactured by AVECIA GROUP): | 0.1% |

Magenta Ink

| | |
|---|---|
| Liquid dispersion 1 of surface reformed magenta pigment (solid portion 20%, solvent: water): | 20% |
| Polyether-based Urethane Resin Particulate (SUPERFLEX ® 130, solid portion 35%, solvent: water, manufactured by DAI-ICHI KOGYO SEIYAKU CO., LTD.): | 20% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 10% |
| Water: | 17.9% |
| Preservatives and fungicides (PROXEL LV, manufactured by AVECIA GROUP): | 0.1% |

Cyan Ink

| | |
|---|---|
| Liquid dispersion 1 of surface reformed cyan pigment (solid portion 20%, solvent: water): | 20% |
| Polyether-based Urethane Resin Particulate (SUPERFLEX ® 130, solid portion 35%, solvent: water, manufactured by DAI-ICHI KOGYO SEIYAKU CO., LTD.): | 20% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 10% |
| Water: | 17.9% |
| Preservatives and fungicides (PROXEL LV, manufactured by AVECIA GROUP): | 0.1% |

Yellow Ink

| | |
|---|---|
| Liquid dispersion 1 of surface reformed yellow pigment (solid portion 20%, solvent: water): | 20% |
| Polyether-based Urethane Resin Particulate (SUPERFLEX ® 130, solid portion 35%, solvent: water, manufactured by DAI-ICHI KOGYO SEIYAKU CO., LTD.): | 20% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 10% |
| Water: | 17.9% |
| Preservatives and fungicides (PROXEL LV, manufactured by AVECIA GROUP): | 0.1% |

White Ink

| | |
|---|---|
| Pigment liquid dispersion of white pigment (solid portion 25%, solvent: water): | 30% |
| Polyether-based Urethane Resin Particulate (SUPERFLEX ® 130, solid portion 35%, solvent: water, manufactured by DAI-ICHI KOGYO SEIYAKU CO., LTD.): | 10% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 5% |
| Tripropyleneglycol monomethylether (boiling point: 242 degrees C., molecular weight: 206) | 5% |
| Water: | 17.9% |
| Preservatives and fungicides (PROXEL LV, manufactured by AVECIA GROUP): | 0.1% |

An inkjet printer remodeled based on IPSiO GXe 5500 (manufactured by Ricoh Company Ltd.) to be capable of installing an ink set of black, magenta, cyan, yellow, and white was filled with an ink and a test pattern (band pattern) was printed on a transparent PET sheet of non-porous substrate (LLPET 1223, manufactured by Sakurai Co., Ltd.). In the test pattern, on the white ink solid image were printed each of the four color solid images adjacent to each other.

Blur and gloss of the obtained image were evaluated as follows. The results are shown in Table 2.

Evaluation on Blur

The blur of the test pattern was visually checked and the degree thereof was evaluated according to the following criteria.

Evaluation Criteria

A: No image blur

B: Very slight image blur confirmed at a portion of the border between black and yellow C: Image blur confirmed at the entire of the border portion between black and yellow D: Image blur confirmed all over the band pattern Evaluation on Image Gloss at 60 degrees of the solid image of black ink was measured by a gloss meter (4501, manufactured by BYK Gardener). A larger reading on gloss level means better gloss.

Examples 2 to 22

The test pattern was printed with each ink set of Examples 2 to 22 in the same manner as for the ink set of Example 1 except that the ink set of Example 1 was changed to each of the ink sets of Examples 2 to 22 shown in the columns of Tables 1-1 to 1-5 and the blur and gloss of the obtained images were evaluated. The results are shown in Table 2.

Example 23

The following recipe was mixed and stirred and thereafter filtered by a 0.2 μm polypropylene filter to prepare light magenta ink and light cyan ink.

Light Magenta Ink

| | |
|---|---|
| Liquid dispersion 1 of surface reformed magenta pigment (solid portion 20%, solvent: water): | 8% |
| Polyether-based urethane resin particulate (SUPERFLEX ® 130, solid portion 35%, solvent: water, manufactured by DAI-ICHI KOGYO SEIYAKU CO., LTD.): | 20% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 10% |
| Water: | 29.9% |
| Preservatives and fungicides (PROXEL LV, manufactured by AVECIA GROUP): | 0.1% |

Light Cyan Ink

| | |
|---|---|
| Liquid dispersion 1 of surface reformed cyan pigment (solid portion 20%, solvent: water): | 8% |
| Polyether-based urethane resin particulate (SUPERFLEX ® 130, solid portion 35%, solvent: water, manufactured by DAI-ICHI KOGYO SEIYAKU CO., LTD.): | 20% |
| Polyether modified silicone-based surfactant (KF-351A, manufactured by Shin-Etsu Chemical Co., Ltd.): | 2% |
| 2,3-butanediol: | 30% |
| 3-methoxy-3-methyl butanediol | 10% |
| Water: | 29.9% |
| Preservatives and fungicides (PROXEL LV, manufactured by AVECIA GROUP): | 0.1% |

An inkjet printer remodeled based on IPSiO GXe 5500 (manufactured by Ricoh Company Ltd.) to be capable of installing an ink set of the light magenta ink, the light cyan ink, the black ink, the magenta ink, the cyan ink, the yellow ink, and the white ink manufactured in Example 1 was filled with an ink and a test pattern (band pattern) was printed on a transparent PET sheet of non-porous substrate (LLPET 1223, manufactured by Sakurai Co., Ltd.). In the test pattern, on the white ink solid image were printed each of the six color solid images adjacent to each other.

Blur and gloss of the obtained image were evaluated in the same manner as in Example 1. The results are shown in Table 2.

Comparative Example 1

An ink set was prepared in the same manner as for the ink set of Example 1 except that the polyether-modified silicone-based surfactant of each ink was changed to a fluorine-containing surfactant (FC-4430, manufactured by 3M Japan Limited) and the test pattern (band pattern) was printed with the ink set followed by evaluation. The results are shown in Table 2.

Comparative Example 2

An ink set was prepared in the same manner as for the ink set of Example 1 except that the content of the polyether-modified silicone-based surfactant of each ink was changed to 0.5% and the content of water was changed to 18.4% and the test pattern (band pattern) was printed with the ink set followed by evaluation.
The results are shown in Table 2.

Comparative Example 3

An ink set was prepared in the same manner as for the ink set of Example 1 except that the content of the polyether-modified silicone-based surfactant of each ink was changed to 5% and the content of water was changed to 14.9% and the test pattern (band pattern) was printed with the ink set followed by evaluation.
The results are shown in Table 2.

Comparative Example 4

An ink set was prepared in the same manner as for the ink set of Example 1 except that no polyether-based urethane resin particulates were added, the content of the dispersion element of the pigment was changed to 30% for black, magenta, cyan, and yellow ink and the content of the dispersion element of the pigment was changed to 40% for white ink and the test pattern (band pattern) was printed with the ink set followed by evaluation. The results are shown in Table 2.

Comparative Example 5

An ink set was prepared in the same manner as for the ink set of Example 1 except that the dispersion element 1 of each ink except for white ink was changed to the dispersion element 11 of each ink and the test pattern (band pattern) was printed with the ink set followed by evaluation. The results are shown in Table 2.

Comparative Example 6

An ink set was prepared in the same manner as for the ink set of Example 1 except that the dispersion element 1 of each ink except for white ink was changed to the dispersion element of polymer particulate containing pigment of each ink and the test pattern (band pattern) was printed with the ink set followed by evaluation. The results are shown in Table 2.

Comparative Example 7

An ink set was prepared in the same manner as for the ink set of Example 1 except that tripropyleneglycol monomethylether of the white ink was changed to diethyleneglycol monomethylether (boiling point: 194 degrees C., molecular weight 120) and the test pattern (band pattern) was printed with the ink set followed by evaluation. The results are shown in Table 2.

Comparative Example 8

An ink set was prepared in the same manner as for the ink set of Example 1 except that tripropyleneglycol monomethylether of the white ink was changed to triethylene glycol monobutylether (boiling point: 271 degrees C., molecular weight 206) and the test pattern (band pattern) was printed with the ink set followed by evaluation. The results are shown in Table 2.

Comparative Example 9

An ink set was prepared in the same manner as for the ink set of Example 1 except that no tripropyleneglycol monomethylether of white ink was added and the content of 3-methoxy-3-methylbutanediol was changed to 10% and the test pattern (band pattern) was printed with the ink set followed by evaluation. The results are shown in Table 2.

The details of the components denoted by the symbols *1 to *4 in Table 1-1 to 1-5 are as follows. In addition, the values of each component column represent the content (% by weight).

*1: Polyether-based urethane resin particulate (SUPERFLEX® 130)
*2: 3-methoxy-3-methyl butanediol
*3: Polyether modified silicone-based surfactant (KF-351A)
*4: PROXEL LV

TABLE 1-1

| | Color | Dispersion element of pigment | Resin (*1) | Water soluble organic solvent | | | | |
|---|---|---|---|---|---|---|---|---|
| | | | | Solvent 1 | | Solvent 2 (*2) | Solvent 3 | |
| Example 1 | Black | 1 | 20 | 20 | 2,3-butanediol | 30 | 10 | — | — |
| | Magenta | 1 | 20 | 20 | 2,3-butanediol | 30 | 10 | — | — |
| | Cyan | 1 | 20 | 20 | 2,3-butanediol | 30 | 10 | — | — |
| | Yellow | 1 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 2 | Black | 1 | 20 | 20 | 2,3-butanediol | 30 | 10 | — | — |
| | Magenta | 1 | 20 | 20 | 2,3-butanediol | 30 | 10 | — | — |
| | Cyan | 1 | 20 | 20 | 2,3-butanediol | 30 | 10 | — | — |
| | Yellow | 1 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 3 | Black | 1 | 20 | 20 | 2,3-butanediol | 30 | 10 | — | — |
| | Magenta | 1 | 20 | 20 | 2,3-butanediol | 30 | 10 | — | — |
| | Cyan | 1 | 20 | 20 | 2,3-butanediol | 30 | 10 | — | — |
| | Yellow | 1 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 4 | Black | 2 | 20 | 20 | 2,3-butanediol | 30 | 10 | — | — |
| | Magenta | 2 | 20 | 20 | 2,3-butanediol | 30 | 10 | — | — |
| | Cyan | 2 | 20 | 20 | 2,3-butanediol | 30 | 10 | — | — |
| | Yellow | 2 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 5 | Black | 3 | 20 | 20 | 2,3-butanediol | 30 | 10 | — | — |
| | Magenta | 3 | 20 | 20 | 2,3-butanediol | 30 | 10 | — | — |
| | Cyan | 3 | 20 | 20 | 2,3-butanediol | 30 | 10 | — | — |
| | Yellow | 3 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |

| | Surfactant (*3) | Preservatives and fungicides (*4) | Water |
|---|---|---|---|
| Example 1 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |
| Example 2 | 1 | 0.1 | 18.9 |
| | 1 | 0.1 | 18.9 |
| | 1 | 0.1 | 18.9 |
| | 1 | 0.1 | 18.9 |
| | 1 | 0.1 | 18.9 |
| Example 3 | 3 | 0.1 | 16.9 |
| | 3 | 0.1 | 16.9 |
| | 3 | 0.1 | 16.9 |
| | 3 | 0.1 | 16.9 |
| | 3 | 0.1 | 16.9 |
| Example 4 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |
| Example 5 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |

TABLE 1-2

| | Color | Dispersion element of pigment | Resin (*1) | Solvent 1 | | Solvent 2 (*2) | Solvent 3 | |
|---|---|---|---|---|---|---|---|---|
| Example 6 | Black | 4 | 20 | 20 | 2,3-butanediol | 30 | 10 | — | — |
| | Magenta | 4 | 20 | 20 | 2,3-butanediol | 30 | 10 | — | — |
| | Cyan | 4 | 20 | 20 | 2,3-butanediol | 30 | 10 | — | — |
| | Yellow | 4 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 7 | Black | 5 | 20 | 20 | 2,3-butanediol | 30 | 10 | — | — |
| | Magenta | 5 | 20 | 20 | 2,3-butanediol | 30 | 10 | — | — |
| | Cyan | 5 | 20 | 20 | 2,3-butanediol | 30 | 10 | — | — |
| | Yellow | 5 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 8 | Black | 6 | 20 | 20 | 2,3-butanediol | 30 | 10 | — | — |
| | Magenta | 6 | 20 | 20 | 2,3-butanediol | 30 | 10 | — | — |
| | Cyan | 6 | 20 | 20 | 2,3-butanediol | 30 | 10 | — | — |
| | Yellow | 6 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 9 | Black | 7 | 20 | 20 | 2,3-butanediol | 30 | 10 | — | — |
| | Magenta | 7 | 20 | 20 | 2,3-butanediol | 30 | 10 | — | — |
| | Cyan | 7 | 20 | 20 | 2,3-butanediol | 30 | 10 | — | — |
| | Yellow | 7 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |
| | Black | 8 | 20 | 20 | 2,3-butanediol | 30 | 10 | — | — |
| | Magenta | 8 | 20 | 20 | 2,3-butanediol | 30 | 10 | — | — |
| | Cyan | 8 | 20 | 20 | 2,3-butanediol | 30 | 10 | — | — |
| | Yellow | 8 | 20 | 20 | 2,3-butanediol | 30 | 10 | — | — |
| Example 10 | White | Dispersion element of white pigment | 30 | 10 | 2,3-butanediol | 30 | 5 | Tripropyleneglycol monomethylether boiling point: 242 degrees C. molecular weight: 206 | 5 |

| | Surfactant (*3) | Preservatives and fungicides (*4) | Water |
|---|---|---|---|
| Example 6 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |
| Example 7 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |
| Example 8 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |

TABLE 1-2-continued

|  |  |  |  |
|---|---|---|---|
| Example 9 |  | 2 | 0.1 | 17.9 |
|  |  | 2 | 0.1 | 17.9 |
|  |  | 2 | 0.1 | 17.9 |
|  |  | 2 | 0.1 | 17.9 |
|  |  | 2 | 0.1 | 17.9 |
| Example 10 |  | 2 | 0.1 | 17.9 |
|  |  | 2 | 0.1 | 17.9 |
|  |  | 2 | 0.1 | 17.9 |
|  |  | 2 | 0.1 | 17.9 |
|  |  | 2 | 0.1 | 17.9 |

TABLE 1-3

|  | Color | Dispersion element of pigment | Resin (*1) | Water soluble organic solvent ||||| 
|---|---|---|---|---|---|---|---|---|
|  |  |  |  | Solvent 1 |  | Solvent 2 (*2) | Solvent 3 |  |
| Example 11 | Black | 9 | 20 | 20 | 2,3-butanediol | 30 | 10 | — | — |
|  | Magenta | 9 | 20 | 20 | 2,3-butanediol | 30 | 10 | — | — |
|  | Cyan | 9 | 20 | 20 | 2,3-butanediol | 30 | 10 | — | — |
|  | Yellow | 9 | 20 | 20 | 2,3-butanediol | 30 | 10 | — | — |
|  | White | Dispersion element of white pigment | 30 | 10 | 2,3-butanediol | 30 | 5 | Tripropyleneglycol monomethylether boiling point: 242 degrees C. molecular weight: 206 | 5 |
| Example 12 | Black | 10 | 20 | 20 | 2,3-butanediol | 30 | 10 | — | — |
|  | Magenta | 10 | 20 | 20 | 2,3-butanediol | 30 | 10 | — | — |
|  | Cyan | 10 | 20 | 20 | 2,3-butanediol | 30 | 10 | — | — |
|  | Yellow | 10 | 20 | 20 | 2,3-butanediol | 30 | 10 | — | — |
|  | White | Dispersion element of white pigment | 30 | 10 | 2,3-butanediol | 30 | 5 | Tripropyleneglycol monomethylether boiling point: 242 degrees C. molecular weight: 206 | 5 |
| Example 13 | Black | 1 | 20 | 20 | 2,3-butanediol | 30 | 10 | — | — |
|  | Magenta | 1 | 20 | 20 | 2,3-butanediol | 30 | 10 | — | — |
|  | Cyan | 1 | 20 | 20 | 2,3-butanediol | 30 | 10 | — | — |
|  | Yellow | 1 | 20 | 20 | 2,3-butanediol | 30 | 10 | — | — |
|  | White | Dispersion element of white pigment | 30 | 10 | 2,3-butanediol | 30 | 5 | Diethylene glycol ethylether boiling point: 202 degrees C. molecular weight: 134 | 5 |
| Example 14 | Black | 1 | 20 | 20 | 2,3-butanediol | 30 | 10 | — | — |
|  | Magenta | 1 | 20 | 20 | 2,3-butanediol | 30 | 10 | — | — |
|  | Cyan | 1 | 20 | 20 | 2,3-butanediol | 30 | 10 | — | — |
|  | Yellow | 1 | 20 | 20 | 2,3-butanediol | 30 | 10 | — | — |
|  | White | Dispersion element of white pigment | 30 | 10 | 2,3-butanediol | 30 | 5 | Triethyleneglycol monomethylether boiling point: 249 degrees C. molecular weight: 164 | 5 |
| Example 15 | Black | 1 | 20 | 20 | 2,3-butanediol | 30 | 10 | — | — |
|  | Magenta | 1 | 20 | 20 | 2,3-butanediol | 30 | 10 | — | — |
|  | Cyan | 1 | 20 | 20 | 2,3-butanediol | 30 | 10 | — | — |
|  | Yellow | 1 | 20 | 20 | 2,3-butanediol | 30 | 10 | — | — |
|  | White | Dispersion element of white pigment | 30 | 10 | 2,3-butanediol | 30 | 5 | Triethylene glycol dimethylether boiling point: 216 degrees C. molecular weight: 178 | 5 |

|  | Surfactant (*3) | Preservatives and fungicides (*4) | Water |
|---|---|---|---|
| Example 11 | 2 | 0.1 | 17.9 |
|  | 2 | 0.1 | 17.9 |
|  | 2 | 0.1 | 17.9 |
|  | 2 | 0.1 | 17.9 |
|  | 2 | 0.1 | 17.9 |

TABLE 1-3-continued

|  |  |  |  |
|---|---|---|---|
| Example 12 | 2 | 0.1 | 17.9 |
|  | 2 | 0.1 | 17.9 |
|  | 2 | 0.1 | 17.9 |
|  | 2 | 0.1 | 17.9 |
|  | 2 | 0.1 | 17.9 |
| Example 13 | 2 | 0.1 | 17.9 |
|  | 2 | 0.1 | 17.9 |
|  | 2 | 0.1 | 17.9 |
|  | 2 | 0.1 | 17.9 |
|  | 2 | 0.1 | 17.9 |
| Example 14 | 2 | 0.1 | 17.9 |
|  | 2 | 0.1 | 17.9 |
|  | 2 | 0.1 | 17.9 |
|  | 2 | 0.1 | 17.9 |
|  | 2 | 0.1 | 17.9 |
| Example 15 | 2 | 0.1 | 17.9 |
|  | 2 | 0.1 | 17.9 |
|  | 2 | 0.1 | 17.9 |
|  | 2 | 0.1 | 17.9 |
|  | 2 | 0.1 | 17.9 |

TABLE 1-4

|  | Color | Dispersion element of pigment | Resin (*1) | Water soluble organic solvent | | | | |
|---|---|---|---|---|---|---|---|---|
|  |  |  |  | Solvent 1 | Solvent 2 (*2) | Solvent 3 | | |
| Example 16 | Black | 1 | 20 | 20 | Propylene glycol | 30 | 10 | — | — |
|  | Magenta | 1 | 20 | 20 | Propylene glycol | 30 | 10 | — | — |
|  | Cyan | 1 | 20 | 20 | Propylene glycol | 30 | 10 | — | — |
|  | Yellow | 1 | 20 | 20 | Propylene glycol | 30 | 10 | — | — |
|  | White | Dispersion element of white pigment | 30 | 10 | Propylene glycol | 30 | 5 | Tripropyleneglycol monomethylether boiling point: 242 degrees C. molecular weight: 206 | 5 |
| Example 17 | Black | 1 | 20 | 20 | 1,2-butanediol | 30 | 10 | — | — |
|  | Magenta | 1 | 20 | 20 | 1,2-butanediol | 30 | 10 | — | — |
|  | Cyan | 1 | 20 | 20 | 1,2-butanediol | 30 | 10 | — | — |
|  | Yellow | 1 | 20 | 20 | 1,2-butanediol | 30 | 10 | — | — |
|  | White | Dispersion element of white pigment | 30 | 10 | 1,2-butanediol | 30 | 5 | Tripropyleneglycol monomethylether boiling point: 242 degrees C. molecular weight: 206 | 5 |
| Example 18 | Black | 1 | 20 | 20 | 1,3-butanediol | 30 | 10 | — | — |
|  | Magenta | 1 | 20 | 20 | 1,3-butanediol | 30 | 10 | — | — |
|  | Cyan | 1 | 20 | 20 | 1,3-butanediol | 30 | 10 | — | — |
|  | Yellow | 1 | 20 | 20 | 1,3-butanediol | 30 | 10 | — | — |
|  | White | Dispersion element of white pigment | 30 | 10 | 1,3-butanediol | 30 | 10 | Tripropyleneglycol monomethylether boiling point: 242 degrees C. molecular weight: 206 | 5 |
| Example 19 | Black | 1 | 20 | 20 | 2,3-butanediol | 15 | 25 | — | — |
|  | Magenta | 1 | 20 | 20 | 2,3-butanediol | 15 | 25 | — | — |
|  | Cyan | 1 | 20 | 20 | 2,3-butanediol | 15 | 25 | — | — |
|  | Yellow | 1 | 20 | 20 | 2,3-butanediol | 15 | 25 | — | — |
|  | White | Dispersion element of white pigment | 30 | 10 | 2,3-butanediol | 15 | 25 | Tripropyleneglycol monomethylether boiling point: 242 degrees C. molecular weight: 206 | 5 |
| Example 20 | Black | 1 | 20 | 20 | Propylene glycol | 15 | 25 | — | — |
|  | Magenta | 1 | 20 | 20 | Propylene glycol | 15 | 25 | — | — |
|  | Cyan | 1 | 20 | 20 | Propylene glycol | 15 | 25 | — | — |
|  | Yellow | 1 | 20 | 20 | Propylene glycol | 15 | 25 | — | — |
|  | White | Dispersion element of white pigment | 30 | 10 | Propylene glycol | 15 | 25 | Tripropyleneglycol monomethylether boiling point: 242 degrees C. molecular weight: | 5 |

TABLE 1-4-continued

|  |  | 206 | | |
|---|---|---|---|---|
|  |  | Surfactant (*3) | Preservatives and fungicides (*4) | Water |
| Example 16 | | 2 | 0.1 | 17.9 |
| | | 2 | 0.1 | 17.9 |
| | | 2 | 0.1 | 17.9 |
| | | 2 | 0.1 | 17.9 |
| | | 2 | 0.1 | 17.9 |
| Example 17 | | 2 | 0.1 | 17.9 |
| | | 2 | 0.1 | 17.9 |
| | | 2 | 0.1 | 17.9 |
| | | 2 | 0.1 | 17.9 |
| Example 18 | | 2 | 0.1 | 17.9 |
| | | 2 | 0.1 | 17.9 |
| | | 2 | 0.1 | 17.9 |
| | | 2 | 0.1 | 17.9 |
| Example 19 | | 2 | 0.1 | 17.9 |
| | | 2 | 0.1 | 17.9 |
| | | 2 | 0.1 | 17.9 |
| | | 2 | 0.1 | 17.9 |
| Example 20 | | 2 | 0.1 | 17.9 |
| | | 2 | 0.1 | 17.9 |
| | | 2 | 0.1 | 17.9 |
| | | 2 | 0.1 | 17.9 |

TABLE 1-5

| | | | | | Water soluble organic solvent | | | | |
|---|---|---|---|---|---|---|---|---|---|
| | | Color | Dispersion element of pigment | Resin (*1) | Solvent 1 | | Solvent 2 (*2) | Solvent 3 | |
| Example 21 | | Black | 1 | 20 | 20 | 2,3-butanediol | 25 | 10 | Tripropylene glycol boiling point: 273 degrees C. | 5 |
| | | Magenta | 1 | 20 | 20 | 2,3-butanediol | 25 | 10 | Tripropylene glycol boiling point: 273 degrees C. | 5 |
| | | Cyan | 1 | 20 | 20 | 2,3-butanediol | 25 | 10 | Tripropylene glycol boiling point: 273 degrees C. | 5 |
| | | Yellow | 1 | 20 | 20 | 2,3-butanediol | 25 | 10 | Tripropylene glycol boiling point: 273 degrees C. | 5 |
| | | White | Dispersion element of white pigment | 30 | 10 | 2,3-butanediol | 30 | 5 | Tripropyleneglycol monomethylether boiling point: 242 degrees C. molecular weight: 206 | 5 |
| Example 22 | | Black | 1 | 20 | 20 | 2,3-butanediol | 25 | 10 | Glycerin boiling point: 290 degrees C. | 5 |
| | | Magenta | 1 | 20 | 20 | 2,3-butanediol | 25 | 10 | Glycerin boiling point: 290 degrees C. | 5 |
| | | Cyan | 1 | 20 | 20 | 2,3-butanediol | 25 | 10 | Glycerin boiling point: 290 degrees C. | 5 |
| | | Yellow | 1 | 20 | 20 | 2,3-butanediol | 25 | 10 | Glycerin boiling point: 290 degrees C. | 5 |

TABLE 1-5-continued

| | | | | | | | | | | |
|---|---|---|---|---|---|---|---|---|---|---|
| | White | Dispersion element of white pigment | 30 | 10 | 2,3-butanediol | 30 | 5 | Tripropyleneglycol monomethylether boiling point: 242 degrees C. molecular weight: 206 | 5 |
| Example 23 | Light magenta | 1 | 8 | 20 | 2,3-butanediol | 30 | 10 | — | — |
| | Light cyan | 1 | 8 | 20 | 2,3-butanediol | 30 | 10 | — | — |
| | Black | 1 | 20 | 20 | 2,3-butanediol | 30 | 10 | — | — |
| | Magenta | 1 | 20 | 20 | 2,3-butanediol | 30 | 10 | — | — |
| | Cyan | 1 | 20 | 20 | 2,3-butanediol | 30 | 10 | — | — |
| | Yellow | 1 | 20 | 20 | 2,3-butanediol | 30 | 10 | — | — |
| | White | Dispersion element of white pigment | 30 | 10 | 2,3-butanediol | 30 | 5 | Tripropyleneglycol monomethylether boiling point: 242 degrees C. molecular weight: 206 | 5 |

| | Surfactant (*3) | Preservatives and fungicides (*4) | Water |
|---|---|---|---|
| Example 21 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |
| Example 22 | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |
| Example 23 | 2 | 0.1 | 29.9 |
| | 2 | 0.1 | 29.9 |
| | 2 | 0.1 | 17.9 |
| | 2 | 0.1 | 17.9 |
| | 2 | 0.1 | 17.9 |
| | 2 | 0.1 | 17.9 |
| | 2 | 0.1 | 17.9 |

TABLE 2

| | Blur (on white Ink) | Gloss (on white Ink) |
|---|---|---|
| Example 1 | A | 102 |
| Example 2 | A | 86 |
| Example 3 | A | 84 |
| Example 4 | A | 98 |
| Example 5 | A | 97 |
| Example 6 | A | 101 |
| Example 7 | A | 99 |
| Example 8 | A | 91 |
| Example 9 | A | 92 |
| Example 10 | A | 84 |
| Example 11 | A | 83 |
| Example 12 | A | 86 |
| Example 13 | B | 97 |
| Example 14 | B | 98 |
| Example 15 | A | 100 |
| Example 16 | A | 99 |
| Example 17 | B | 103 |
| Example 18 | B | 101 |
| Example 19 | B | 97 |
| Example 20 | B | 99 |
| Example 21 | B | 98 |
| Example 22 | B | 98 |
| Example 23 | A | 102 |
| Comparative Example 1 | A | 72 |
| Comparative Example 2 | A | 75 |
| Comparative Example 3 | A | 71 |
| Comparative Example 4 | C | 58 |
| Comparative Example 5 | C | 98 |
| Comparative Example 6 | C | 94 |
| Comparative Example 7 | C | 95 |
| Comparative Example 8 | C | 93 |
| Comparative Example 9 | D | 96 |

As seen in the results shown in Table 2, the images printed with the ink set of the present disclosure have excellent gloss free from image blur when the inks having different colors are printed on the white ink.

To the contrary, the image printed with the ink sets of Comparative Examples which are outside the range of the present disclosure are not good in terms of image blur and gloss.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink set for inkjet, comprising:
a white ink; and
one or more color inks other than the white ink,
wherein the ink set satisfies the following I to III:
I. each ink comprises water, a pigment, resin particulates, a water soluble organic solvent, and a silicone-based surfactant accounting for 1% by weight to 3% by weight of the ink,
II. the pigment contained in each of the one or more color inks is a reformed pigment reformed by at least one of a geminal bisphosphonic acid group or a geminal bisphosphonic acid salt group, and
III. the water soluble organic solvent of the white ink comprises glycol ether having a boiling point of from 200 degrees C. to 250 degrees C.,
wherein a total amount of 2,3-butanediol and propylene glycol accounts for 50% by weight or more of the water soluble organic solvent in each ink.

2. The ink set for inkjet according to claim 1, wherein the reformed pigment in each of the one or more color inks independently comprises at least one group selected from the group consisting of the following groups represented by Chemical Formulae 1 to 4:

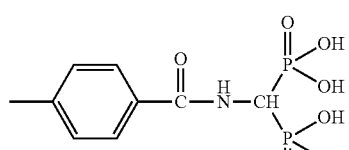
Chemical formula 1

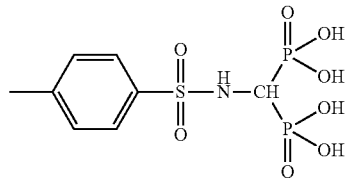
Chemical formula 2

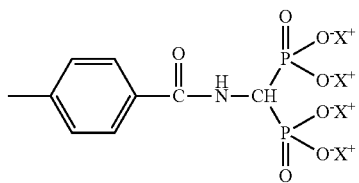
Chemical formula 3 where X represents Li, K, Na, NH$_4$, N(CH$_3$)$_4$, N(C$_2$H$_5$)$_4$, N(C$_3$H$_7$)$_4$, or N(C$_4$H$_9$)$_4$,

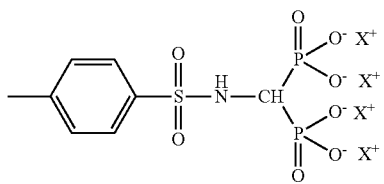
Chemical formula 24 where X represents Li, K, Na, NH$_4$, N(CH$_3$)$_4$, N(C$_2$H$_5$)$_4$, N(C$_3$H$_7$)$_4$, or N(C$_4$H$_9$)$_4$.

3. The ink set for inkjet according to claim 1, wherein the glycol ether of the white ink has a molecular weight of 170 or more.

4. The ink set for inkjet according to claim 1, wherein the water soluble organic solvent in each ink has a boiling point of 250 degrees C. or lower.

5. An inkjet recording method comprising:
discharging the white ink of the ink set for inkjet of claim 1 to a substrate; and then
discharging the one or more color inks other than the white ink of the ink set for inkjet of claim 1 onto the white ink on the substrate.

6. The ink set for inkjet according to claim 1, wherein the glycol ether having a boiling point of from 200 degrees C. to 250 degrees C. is at least one selected from diethylene glycol, diethylene glycol monoisopropylether, diethylene glycol monoisobutylether, triethylene glycol dimethylether, diethylene glycol monobutylether, tripropylene glycol monomethylether, and triethylene glycol monomethylether.

* * * * *